Feb. 24, 1959 R. W. GILBERT 2,875,403
VOLTAGE DISTORTION MEASURING INSTRUMENT
Filed April 26, 1954
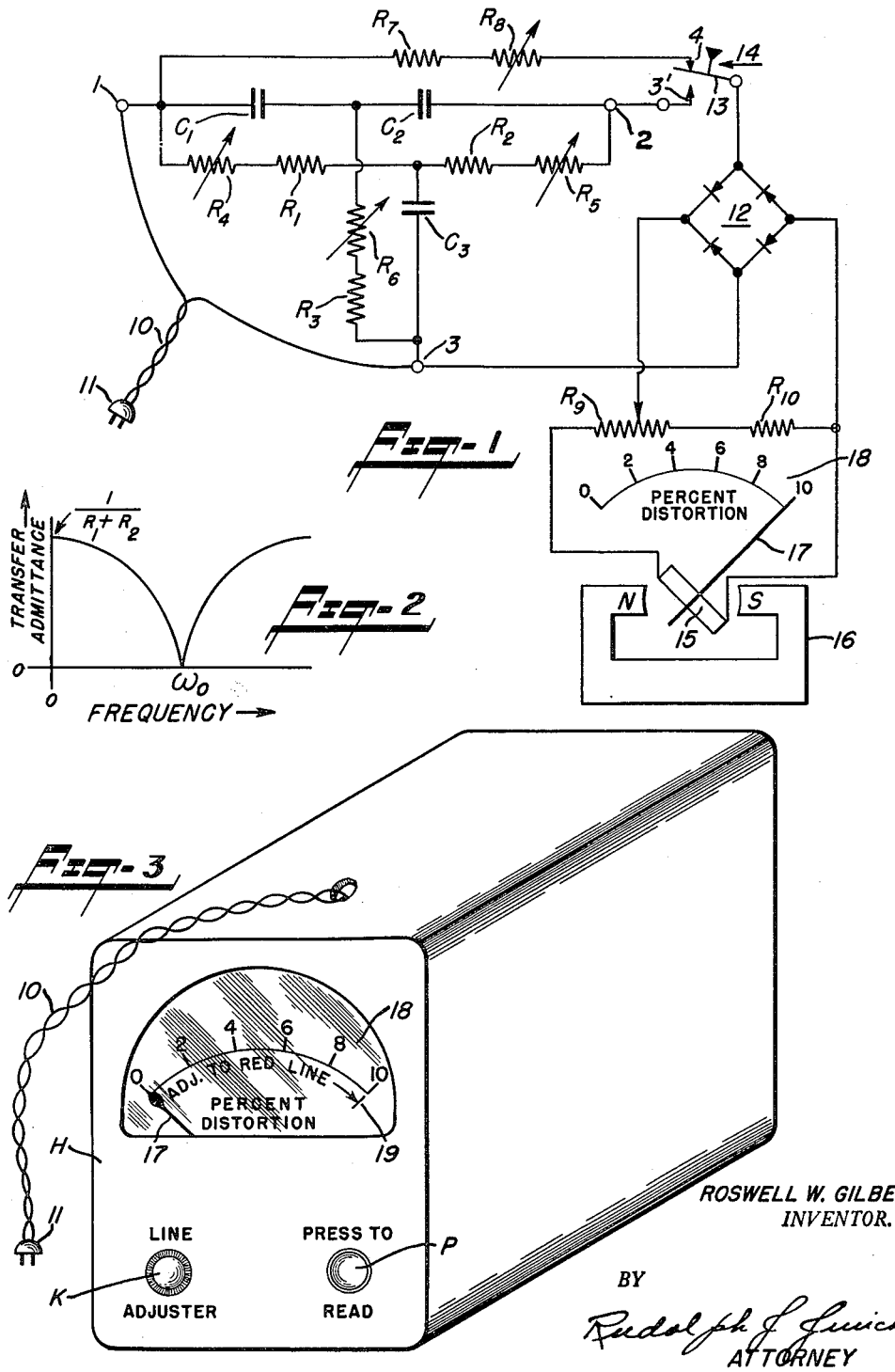
ROSWELL W. GILBERT
INVENTOR.
BY
Rudolph J. Lunick
ATTORNEY

United States Patent Office 2,875,403
Patented Feb. 24, 1959

2,875,403

VOLTAGE DISTORTION MEASURING INSTRUMENT

Roswell W. Gilbert, Montclair, N. J., assignor to Daystrom, Incorporated, Murray Hill, N. J., a corporation of New Jersey Application April 26, 1954, Serial No. 425,561

2 Claims. (Cl. 324—77)

This invention relates to an electrical instrument adapted for connection to an electrical line to indicate the harmonic content, or waveform distortion, of the line voltage.

It is often desirable to measure the waveform distortion, or harmonic content, of service power voltage, particularly that furnished by alternating current power regulators. So far as I am aware, there is not available a simple, portable, direct-reading instrument for this purpose.

The instrument to be described hereinbelow comprises a frequency-rejection network tuned to zero transfer at 60 cycles per second, said network feeding a rectifier type voltmeter provided with a scale to indicate a factor that is a ratio of the harmonic voltage and the fundamental voltage, and including means for adjusting the top mark of the instrument to a specific line voltage value.

An object of this invention is the provision of a portable indicating instrument adapted for connection to a power line to indicate the waveform distortion of the line voltage.

An object of this invention is the provision of a line voltage distortion meter comprising a frequency-rejection network tuned to zero transfer at 60 cycles per second, a four-arm rectifier bridge having input terminals connected to the output terminals of the network, a permanent-magnet, movable-coil instrument responsive to the output of the rectifier bridge, a pointer carried by the instrument movable coil and movable over a scale calibrated directly in terms of percentage of line voltage distortion, and manually-operable means including an adjustable resistor to pre-adjust the movable coil deflection to aline the pointer with a fixed reference mark on the scale.

These and other objects and advantages will become apparent from the following description when taken with the accompanying drawings illustrating my invention. It will be understood that the drawings are for purposes of illustration and are not to be construed as defining the scope or limits of the invention, reference being had for the latter purpose to the claims appended hereto.

In the drawings wherein like reference characters denote like parts in the several views:

Figure 1 is a circuit diagram of my instrument;

Figure 2 is a curve showing the transfer admittance of the frequency-rejecting network; and Figure 3 is a perspective view showing the complete instrument.

Before proceeding to a detailed description of the invention, it is pointed out that the frequency rejection network incorporated in my instrument may be of any of several known types as, for example, a parallel-T resistance-capacitance (R-C) network, or the Wien bridge. The parallel-T network is preferred since it is more flexible of adjustment and has a common input-output junction which simplifies the adjustment switching arrangements.

Reference is now made to the circuit diagram of Figure 1 wherein the three terminals of the parallel-T network are identified by the numerals 1, 2 and 3. The frequency-rejection network comprises the capacitors $C_1$, $C_2$ and $C_3$, and the resistors $R_1$ to $R_6$ inclusive, the resistors $R_4$, $R_5$ and $R_6$ being adjustable. The network input terminals 1 and 3 are adapted for direct connection to the power line by means of the attached cord 10 and plug 11, and the network output terminals 2, 3 are connected to the input junctions of a four-arm rectifier bridge 12 upon closure of the movable blade 13, of the manually-operable switch 14, with the stationary contact 3'. It is here pointed out that the switch 14 is spring biased to normally maintain the movable blade in contact with the other stationary contact 4. The network is tuned to resonance at 60 cycles by means of the adjustable resistors $R_4$, $R_5$ and $R_6$; the transfer admittance characteristics of the so-tuned network being shown by the curve of Figure 2. Consequently, the voltage fed to the input junctions of the rectifier bridge, upon closure of the switch contacts 13, 3', is that due only to the harmonic components of the line voltage.

Actually, the adjustable network resistors $R_4$, $R_5$ and $R_6$ are required in practice because accurate capacitors are not normally available. The point of network adjustment is where:

$$R_1 R_2 = \frac{C_1 + C_2}{\omega_0^2 C_1 C_2 C_3} \tag{1a}$$

and $$R_3 \frac{R_1 + R_2}{R_1 R_2} = \frac{C_3}{C_1 + C_2} \tag{1b}$$

where $\omega_0$ is the resonance frequency in radians per second (usually $2\pi 60 = 377$) and the resistances include the adjustable portions $R_4$, $R_5$ and $R_6$. Two simultaneous expressions for three variables given an infinite number of relations but a common design criteria is:

$$C_1 = C_2 = \frac{C_3}{2} \equiv C_0 \tag{2}$$

and:

$$R_1 = R_2 = 2R_3 \equiv R_0 \tag{3}$$

which reduces expression 1 to:

$$R_0 C_0 = \frac{1}{\omega_0} \tag{4}$$

Conditions 2 and 3, above, give the least total capacitance and, therefore, represent the most economic arrangement. Therefore, condition 2 is a design center relationship for the selection of the capacitors which may have the usual commercial tolerance of ±20%. The resistors $R_4$, $R_5$ and $R_6$ are then trimmed to conform to expression 1, above.

The output voltage of the rectifier bridge is fed to the wire-wound movable coil 15 of the indicating instrument, said movable coil operating in a magnetic flux field established by the permanent magnet 16. Secured to the movable coil is a pointer 17 movable over a scale 18 that is calibrated in percent distortion. A red index, or reference mark, 19, is alined with the top mark of the scale, see Figure 3. The fixed resistor $R_{10}$, and the adjustable resistor $R_9$ form a potentiometer for the adjustment of the voltage supplied to the instrument of the movable coil.

As shown in Figure 3, all electrical components, including the indicating instrument, are contained within a small plastic housing H which measures 3"×4½"×4½". The instrument pointer and scale are visible through an appropriate window and the line cord extends into the housing through a suitable hole. Available at the front of the device is a push button P which actuates the movable blade of the switch 14, see Figure 3, and a rotatable knob K which controls the setting of the network resistor $R_9$.

The instrument is standardized to a specific line voltage with the switch 14 in its normal position, that is, with the movable blade 13 engaging the upper contact 4. This connects the rectifier bridge across the line through the fixed resistor $R_7$ and the adjustable resistor $R_8$ whereby the instrument acts as a straight-forward non-selective voltmeter. The shunt $R_9$ is then adjusted, by rotation of the knob K, Figure 3, until the pointer is alined with the reference mark 19 on the scale. The push button P is then depressed thereby transferring the movable blade 13, of the switch 14, to the network terminal contact 3' whereupon the output voltage of the network is impressed across the indicating instrument. The instrument pointer will now deflect an amount corresponding to the voltage of the harmonic components of the line voltage.

Actually, the system does not respond equally to all harmonics but the 3rd harmonic usually predominates and the circuit is designed to give effect to the voltage at frequency $3\omega_0$. The adjustable resistor $R_8$, in the checking circuit, serves to track this voltage against the preadjustment of resistor $R_9$. Specifically, in adjusting the instrument at the factory, 11 volts at a frequency of 180 cycles per second is applied to the plug 11. The switch 14 is depressed and the resistor $R^9$ adjusted until the instrument pointer is alined with top scale mark, i. e. the 10% scale marking. The switch 14 is now released and the applied voltage raised to 110 volts. The resistor $R_8$ is now adjusted so that the instrument pointer again is alined with the top mark on the scale.

The adjustable resistors $R_4$, $R_5$, $R_6$ and $R_8$ are set at the factory whereas the resistor $R_9$ is settable by the user during the instrument standardizing procedure prior to taking an actual reading by pressing the push button P.

A useful instrument range is found to be one wherein the instrument will read 10% full scale on the 3rd harmonic and the illustrated scale is so marked. In such instrument the various components will have the following values:

| | | |
|---|---|---|
| $C_1$ and $C_2$ | mfds | .25 |
| $C_3$ | mfds | .5 |
| $R_1$ and $R_2$ | ohms | 10,000 |
| $R_3$ | do | 5,000 |
| $R_4$ and $R_5$ | do | 1,000 |
| $R_6$ | do | 500 |
| $R_7$ | do | 8,000 |
| $R_8$ | do | 20,000 |
| $R_9$ | do | 6 |
| $R_{10}$ | do | 50 |

Having now given a detailed description of my invention in accordance with the requirements of the patent statutes what I desire to protect by Letters Patent of the United States is set forth in the following claims.

I claim:

1. An electrical instrument for the direct measurement of the waveform distortion of an alternating current power line said instrument comprising a frequency rejection network tuned to resonance at the power line frequency and having an input terminal, an output terminal and a common input-output terminal; leads connected to the input and common terminal and adapted for connection across the power line; a rectifier bridge having one input junction connected to said common terminal; a manually-operable switch having a movable contact connected to the other bridge input junction, a first stationary contact connected to the said output terminal and a second stationary contact; means normally biasing the movable contact into contact with the said second stationary contact; an adjustable resistor connected between the said input terminal and the said second stationary contact of the switch; a wire-wound movable coil operating in a unidirectional magnetic flux field; a pointer carried by the movable coil; a scale cooperating with the pointer and calibrated in percent distortion; a distinguishing reference mark on the scale; and a potentiometer connecting the rectifier bridge output junctions to the wire-wound movable coil; the said pointer being alignable with the said reference mark upon adjustment of the said adjustable resistor when the said leads are connected to the power line and the said switch is in the normal position.

2. The invention as recited in claim 1, wherein the full range of the calibrated scale is 10 percent of the magnitude of the 3rd harmonic of the power line voltage.

References Cited in the file of this patent

UNITED STATES PATENTS

| | | |
|---|---|---|
| 2,005,011 | Specht | June 18, 1935 |
| 2,290,754 | Fluharty | July 21, 1942 |

OTHER REFERENCES

Turner: Radio News, January 1941, pages 16, 17, 57, 58.

Transmission Lines & Networks, W. C. Johnson, page 303, McGraw Hill Book Co., 1950.